United States Patent [19]

Norland

[11] Patent Number: 4,827,559
[45] Date of Patent: May 9, 1989

[54] VACUUM SYSTEM FOR PAVEMENT GROOVING MACHINE

[75] Inventor: Richard S. Norland, Stillwell, Kans.

[73] Assignee: Federal-Mogul Corporation, Southfield, Mich.

[21] Appl. No.: 753,747

[22] Filed: Jul. 10, 1985

[51] Int. Cl.$^4$ .......................................... EOIC 23/09
[52] U.S. Cl. ..................................................... 15/322
[58] Field of Search ............. 299/39; 404/90; 15/322, 15/339, 415 R, 418, 419, 417, 415 A

[56] References Cited

U.S. PATENT DOCUMENTS

| | | | |
|---|---|---|---|
| 918,930 | 4/1909 | Thurman | 15/419 X |
| 2,131,398 | 9/1938 | Hubbart | 15/415 |
| 3,080,598 | 3/1963 | McEachern | 15/415 X |
| 3,132,364 | 5/1964 | Oxley | 15/418 X |
| 3,272,651 | 9/1966 | Quirk | 15/418 X |
| 3,572,841 | 3/1971 | Rhodes | 299/39 |
| 3,724,900 | 4/1973 | Hatcher et al. | 299/39 |
| 3,779,607 | 12/1973 | Staab | 299/39 |
| 3,802,742 | 4/1974 | Zuzelo | 299/39 |
| 3,862,469 | 1/1975 | Burgoon | 15/418 X |
| 3,923,341 | 12/1975 | Miller | 299/39 X |
| 4,516,808 | 5/1985 | Staab et al. | 404/90 X |

Primary Examiner—Harvey C. Hornsby
Assistant Examiner—Scott J. Haugland
Attorney, Agent, or Firm—Lawrence J. Shurupoff; Robert F. Hess

[57] ABSTRACT

A one-piece blade shroud and vacuum duct system for removing a water and swarf slurry from a pavement grooving site includes an adjustable intake nozzle for directly receiving the slurry hurled by the rotating blades of a pavement grooving machine. Only two nozzles are used in order to simplify the vacuum ducting and to improve the efficiency of the system. By disposing a water jet assembly within the blade shroud, efficiency is further increased.

13 Claims, 5 Drawing Sheets

FIG 6b

VACUUM SYSTEM FOR PAVEMENT GROOVING MACHINE

BACKGROUND OF THE INVENTION

1. Field Of The Invention

This invention generally concerns vacuum systems for removing cut or abraded particles from a working surface and more particularly concerns a vacuum system for removing water and swarf from the cutting path of a pavement grooving machine.

2. Description Of Prior Developments

In the road surfacing industry it is frequently necessary to increase tire traction upon a paved roadway surface. A common solution is to cut a series of grooves into the pavement surface with a groove cutting device having a ganged saw blade assembly. Up to several dozen diamond grooving blades may be mounted upon a common shaft and driven along the roadway to cut a grooved path up to several feet wide and up to one-half inch deep.

The cutting of the roadway, which is typically cement or asphalt, generates tremendous amounts of frictional heat. This heat must be dissipated in order to increase the useful life of the cutting blades. One standard cooling method is to spray large amounts of water over the blades and over the pavement. This reduces friction, absorbs heat and washes away the cut pavement particles, called swarf, from the path of the blades. Where large pavement grooving machines are used, the amount of cooling water required becomes quite significant and when mixed with the large amounts of swarf, the water and swarf mixture forms an extremely messy slurry over large portions of the roadway. This residue, which may have a mud or clay type of consistency, must be removed before the roadway can be placed in service.

In the past, attempts have been made to remove the water and swarf from the pavement with various vacuum devices which draw the slurry through a plurality of nozzles into a vacuum manifold. One particular arrangement which is still in use is known as a "drag bar" which is typically mounted around the periphery of a blade box which covers the cutting blades. The drag bar is usually formed with a rectangular frame having a downward facing U-shaped channel approximately one inch high and two or three inches wide. A vacuum source is connected to the channel through a series of nozzles which are spaced along the outer surface of the frame so that each nozzle communicates via a flexible hose with a central vacuum manifold. The vacuum manifold is in turn connected to a cyclone separator and a vacuum source.

Numerous problems have been experienced with the use of drag bars. A very common problem is the plugging of the nozzles and hoses which connect the drag bar with the vacuum source. Such nozzles and hoses are often of small diameter, about one or two inches, and thus easily blocked by the water and swarf mixture which usually has a viscous consistency. Moreover, the flexible hoses are prone to wear and require frequent replacement. Also prone to wear is the lower surface of the drag bar channel which is continually abraded as it is dragged over the pavement. As the channel wears, its performance suffers from unwanted vacuum leakage and thus requires frequent replacement or rebuilding.

Still another problem associated with drag bars is the sudden fluid contraction and/or expansion energy losses which arise at each interface or connection between the drag bar frame channel and the hose nozzles. These losses reduce the ability of the vacuum system to effectively pick up and remove water and swarf from the pavement. Other energy losses are incurred at each subsequent transition in the vacuum ducting where sudden fluid expansion or contraction losses further promote plugging and greatly reduce the vacuum system performance. While some drag bars are provided with constant acceleration-type nozzles in place of constant diameter pipe-type nozzles, sudden contraction and/or expansion losses are still incurred downstream of the nozzle. As a result, these drag bar systems are also prone to blockage.

Another major drawback of a drag bar system is that by design, the water and swarf is first decelerated by impact against a blade shroud called a blade-box which serves as a safety housing that covers the cutting blades. After impact with the blade-box, the water and swarf are allowed to settle to the cutting surface. The water and swarf slurry must then be reaccelerated upwards by a vacuum generated air flow as the drag bar passes over the slurry. This is a clear waste of energy.

Another swarf removal system, commonly called a "slinger tray" system uses the tangential acceleration affect of a rotary cutting blade which is partially submerged in a fluid medium to transport the fluid along with swarf into a catch basis. No vacuum system is used. The slinger tray system typically removes from thirty to fifty percent of the swarf from the pavement. A major problem associated with the slinger tray system is that most of the swarf is left on the ground. This condition accelerates blade wear as the blades must spin within a slurry of abrasive swarf. Another significant problem with this system is that the large and heavy swarf particles which are entrained in the slurry tend to settle out, accumulate and fill the catch basis trough. This eventually blocks the slurry flow path and renders the basin useless.

All of the known systems discussed above require a blade-box which functions independently of the swarf removal system, and those systems which use a vacuum pick up mechanism require a separate removal device which surrounds the blade-box and which requires many nozzles connected to a central collection system. A significant problem associated with multiple nozzle systems is that it is extremely difficult to maintain the same level of vacuum between one nozzle and the next. What usually happens in practice is that the nozzle or nozzles with the least resistance, that is, those which are picking up the least amount of slurry and swarf, will, by the inherent characteristic of a vacuum system, receive the bulk of the vacuum flow available to the system. This is obviously a significant drawback since those nozzles which require the greatest vacuum flow receive the least.

Still another problem associated with multiple nozzle systems is that by their design, certain lengths or areas of the drag bar and pick up assembly are left without any available vacuum, thereby creating an area for slurry and swarf to escape from the vacuum system and leaving large amounts of slurry on the pavement.

Another drawback of systems using drag bars is that these systems are generally difficult to inspect. That is, because of the geometric configuration of the drag bars and the limited space available for their installation, it is quite difficult for the operator to inspect the cutting shaft bearings, vacuum hoses, vacuum nozzles and the drag bar integrity when installed on pavement grooving machines.

SUMMARY OF THE INVENTION

Accordingly, this invention has been developed to overcome the problems described above, and therefore has an object to provide a vacuum system which is of simple construction, resists plugging, avoids the use of multiple nozzles and hoses and is easily inspected and maintained.

Another object is to eliminate the cumbersome and inefficient separated drag bar and blade-box assembly by incorporating the vacuum system within the blade-box while improving vacuum performance without significantly increasing the horsepower required to supply the vacuum.

Yet another object is to provide a vacuum system which avoids energy losses due to sudden contractions and/or expansions within the vacuum flow path by using a constant acceleration vacuum duct design.

Still another object is to make use of the kinetic energy of the water and swarf as it is propelled by the cutting blades to direct the water and swarf directly into the intake port of the vacuum system.

Another object is to prevent the water and swarf from falling to the cutting surface before entering the intake port of the vacuum ducting thereby reducing the vacuum necessary to draw the water and swarf into the vacuum system.

A further object is to provide a vacuum system having rolling contact over the cutting surface thereby preventing the abrasive wear previously associated with drag bars.

A still further object is to provide a vacuum system having an adjustable intake port for optimally adapting the vacuum system to various operating conditions. The vacuum system is further provided with a height adjustment for adjusting the amount of ground clearance and vacuum flow along the blade-box periphery to achieve the same object.

Yet another object is to provide a blade box with an internal water jet system which sprays water at a tangent to the rotating cutting blades and at a velocity which approximates that of the blade peripheries.

The foregoing and other objects are achieved according to the present invention by the provision of a blade-box having an integral vacuum pick up assembly which avoids the use of numerous vacuum nozzles and hose clusters and which provides a substantially uniform vacuum induced air flow across the full width of the cutting path. The vacuum pick up system is mounted upon a floating blade-box which automatically sets the proper clearance between the vacuum intake ports and the pavement surface.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein.

DETAILED DESCRIPTION OF THE PREFERRED EMBODIMENTS

Figure 1:
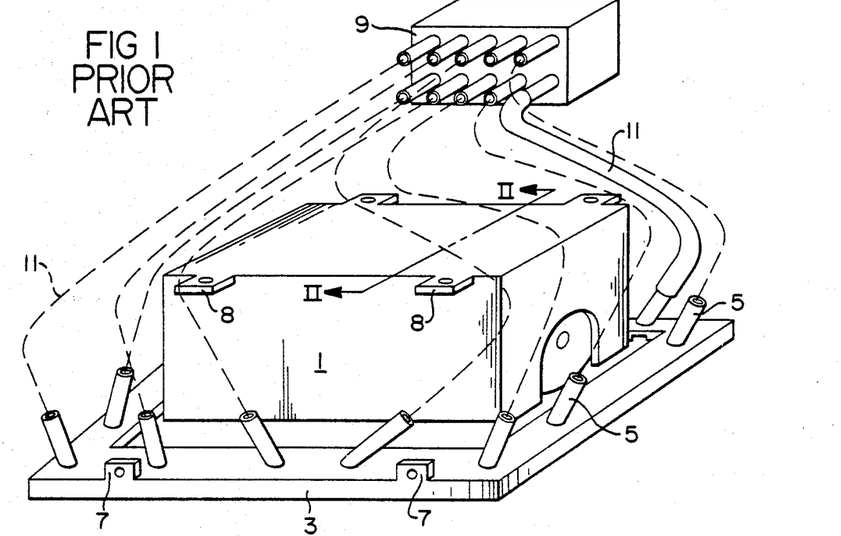
FIG. 1 is a schematic perspective view of a prior art blade box and drag bar assembly connected to a multi-port vacuum manifold.
Figure 1A:
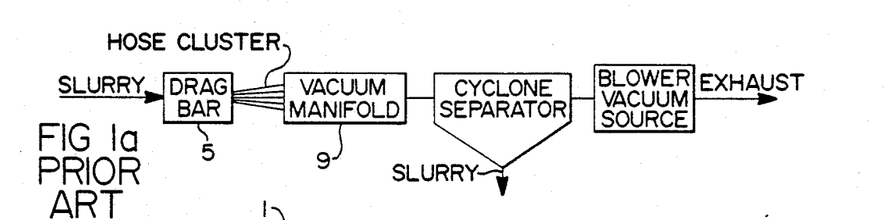
FIG. 1a is a schematic flow diagram of the prior art system of FIG. 1.

The vacuum system developed in accordance with the present invention will now be described in conjunction with the accompanying drawing Figures. To distinguish the present invention from conventional systems, reference is initially made to FIGS. 1 through 3 which depict a typical known drag bar assembly. As shown in FIG. 1, a blade box (1) is surrounded by a drag bar assembly (3) which is fitted with a plurality of nozzles (5). The drag bar is shown completely separated from the blade box and is adapted to be connected to the frame of a grooving machine with brackets (7). The blade box may be separately connected to the same frame with brackets (8). Each nozzle is connected to a vacuum manifold (9) by a hose (11). The vacuum manifold in turn is typically connected to a cyclone separator and vacuum source as schematically shown in FIG. 1a.

Figure 2:
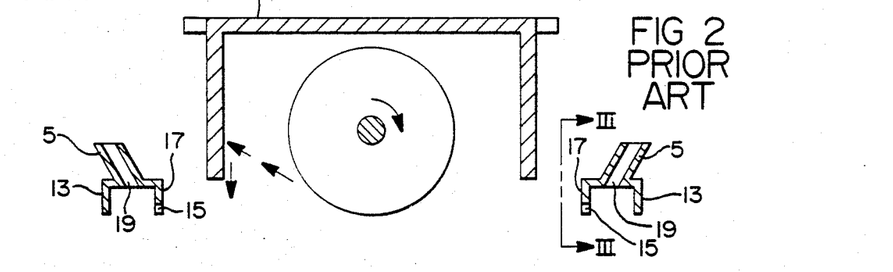
FIG. 2 is a cross sectional side elevation view of the prior art system of FIG. 1 taken through a vertical plane extending through line II—II of FIG. 1.
Figure 3:
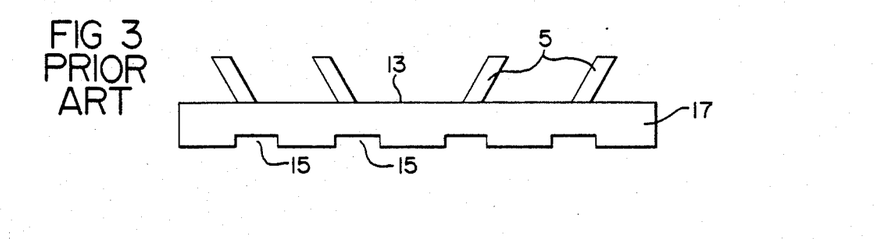
FIG. 3 is a view of the prior art drag bar taken along line III—III of FIG. 2.

As seen in FIGS. 2 and 3, the drag bar frame is formed from a U-shaped channel member (13) which is provided with a plurality of intake ports (15) along its inner face (17). As noted above, significant energy losses occur along these intake ports as well as adjacent the nozzle entrances (19) where sudden changes in direction and cross section in the vacuum flow path exist.

Figure 4:
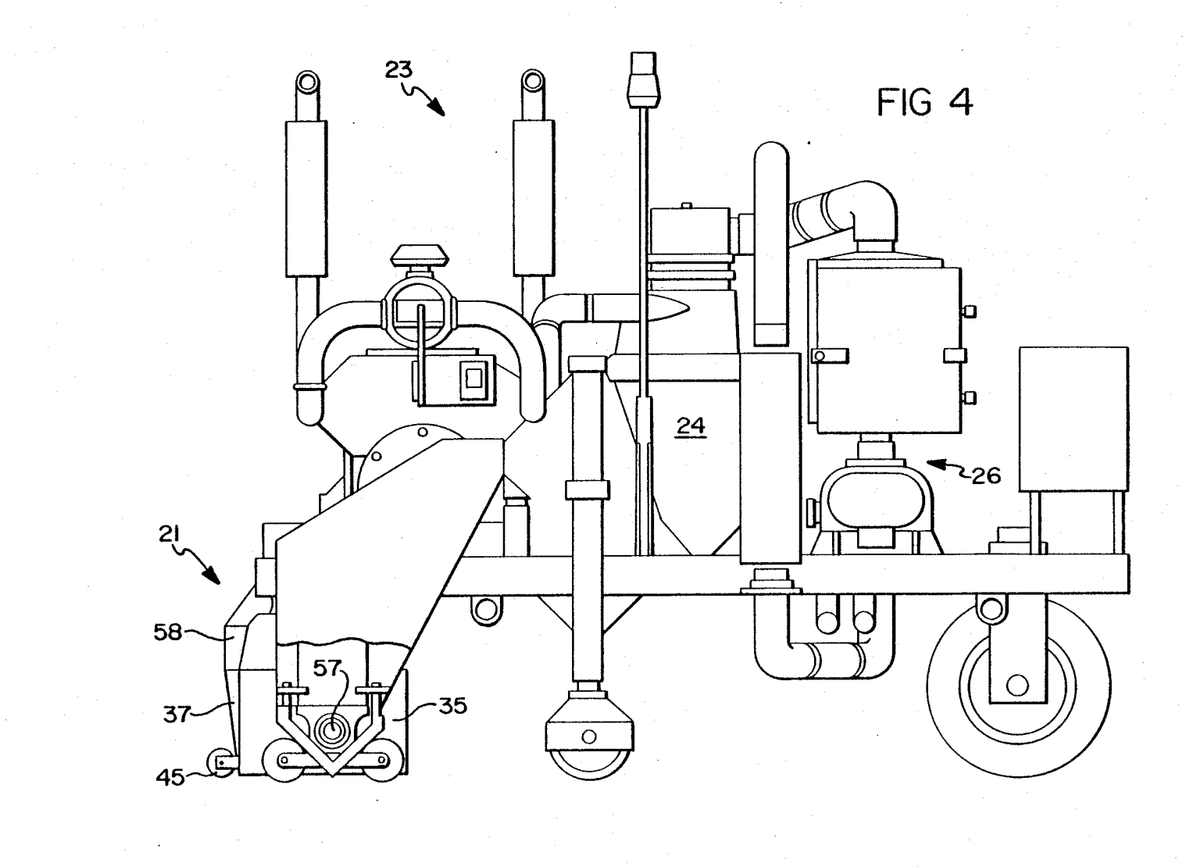
FIG. 4 is a side elevation view, partly in section showing the vacuum system of the present invention mounted upon a conventional pavement grooving apparatus.
Figures 5, 5A, 6A:
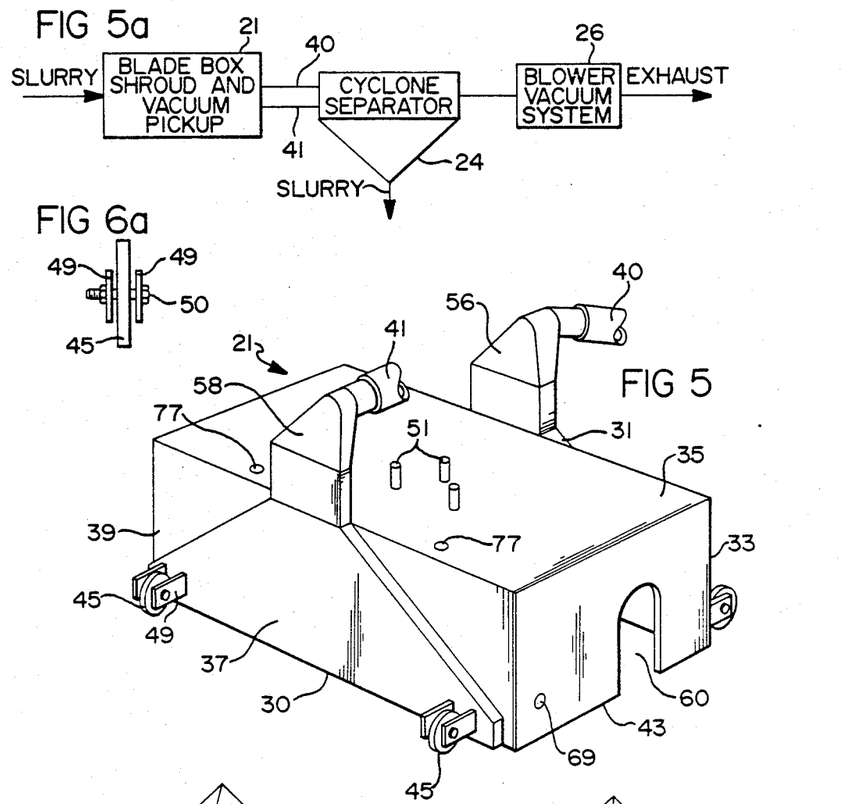
FIG. 5 is a perspective view of the integral blade-box and vacuum ducting system according to the present invention.
FIG. 5a is a schematic flow diagram of the vacuum system according to the present invention.
FIG. 6a is a view of the wheel assembly taken along line VI—VI of FIG. 6.

In order to overcome the drawbacks of the blade box and drag bar arrangement shown in FIGS. 1 through 3, the combined blade box and integral vacuum intake system (21) shown in FIGS. 4, 5 and 6 has been developed. In FIG. 4 the blade box and vacuum intake system is shown mounted upon a pavement grooving apparatus (23) of known construction and is fluidly connected via ducting to a cyclone separator (24) which in turn is connected to a blower or vacuum pump (26). The blower shown draws 17 inches of mercury and can generate a gas velocity at the intake nozzles of the blade box of 1000 feet per minute. The invention is primarily concerned with the blade box and vacuum intake system rather than any particular configuration of the grooving apparatus which is external to the blade box.

The details of the blade box and vacuum intake system are shown in FIGS. 5 and 6. A major concern with this design is the elimination of a two-part assembly composed of drag bar and a separate blade box. This results in the simplification of the vacuum system as an integral unit wherein the vacuum system actually forms a portion of the blade box. By eliminating the separate drag bar from the periphery of the blade box, the space requirements for the vacuum system are reduced so that greater design flexibility is afforded for the placement of the remaining components of the grooving apparatus.

Nozzles (30) form the intake ports which are directly attached to the blade-box system and extend across substantially the full width of the blade shroud so that a substantially uniform flow is provided across the cutting path to prevent any slurry from remaining on the pavement. A front intake duct (31) is attached to the front face (33) of the blade box (35) and a rear intake duct (37) of similar shape is attached to the rear face (39) of the blade box. The lower front face (38) of the front intake duct is seen in FIG. 6 to form a portion of the blade box shroud which covers the ganged assembly of rotating blades.

Both the front and rear intake ducts are designed as substantially constant accleration fluid ducts. This means that the cross-sectional area of the fluid flow path through each duct decreases at a constant rate in a downstream direction so that the velocity of the fluid flowing therethrough increases at a correspondingly constant rate.

It can be further seen in FIG. 5 that no sudden contractions or expansions are present in the flow paths of the intake ducts so that their tendency to clog is minimized. Sharp changes in flow path cross section and direction are avoided since such conditions promote the loss of entrainment of swarf from the flow. Moreover, by using only two ducts, the maintenance of a desired vacuum balance between them is facilitated as compared with a multiple duct drag bar system having numerous intake ports.

Figure 6B:
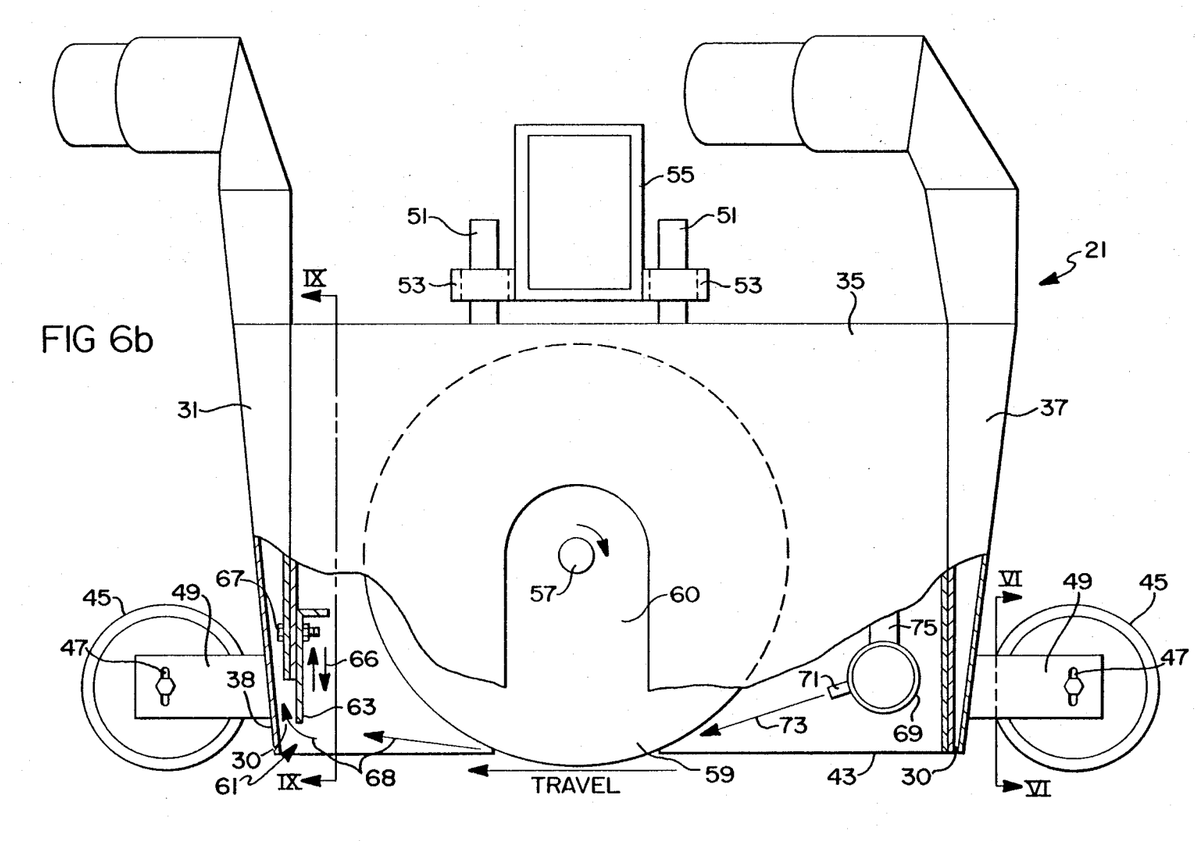
FIG. 6b is a side elevational view, partly in section, showing the integral blade box and vacuum ducting system provided with a single nozzle.

The system of FIG. 5 can be even further simplified by providing only a single duct, the front duct, and eliminating the rear duct as shown in FIG. 6b. However, even though the majority of slurry enters the front duct, it has been found desirable to use a rear duct as a final "polishing" duct for picking up small amounts of slurry which escape the front duct.

By using only two relatively large wide intake nozzles, one on the front duct and one on the rear, the need for a hose cluster and a vacuum manifold is eliminated. This design allows the direct coupling of each duct (31,37) via a respective hose (40,41) to a separate entry portal of a cyclone separator as schematically shown in FIG. 5a.

It has been found advantageous to maintain a set predetermined air gap spacing between the mouth of each nozzle and the surface being grooved as well as between the bottom edge of the blade box and the cutting surface. This is achieved by mounting four height adjustable wheels (45) on the blade box vacuum system as further shown in FIGS. 5 and 6. This provides the added benefit of rolling contact with the grooved surface instead of the sliding or dragging abrasive contact experienced with drag bar systems.

As seen in FIG. 6, the height adjustment is achieved by forming a vertical slot (47) about one inch long in each wheel support flange (49). The wheels may then be vertically adjusted and each bolted in position as shown in FIG. 6a with a simple nut and bolt fastener (50) which also serves as a dead axle. In practice it has been found desirable to limit the clearance between the lower edge of the blade box and the pavement surface to less than $\frac{1}{4}$ inch in order to maintain sufficient air flow from the slurry toward the nozzles to draw away the slurry. If the clearance is too great, too much air will be drawn from outside the blade shroud at heights above the pavement which will adversely affect the direction of flow thereby leaving insufficient suction to adequately remove the slurry. As the altitude of the surface being grooved increases, this clearance should be decreased to ensure effective performance by maintaining an adequate vacuum within the blade box.

Another desirable feature incorporated into the blade box vacuum system is the provision of an automatic blade wear and groove depth compensation mechanism. Since groove depth specifications vary depending upon location and operating environment, and since the diameter of the grooving blades decreases with wear, it is desirable to allow the blade box vacuum system to maintain its spacing from the grooved surface independently of the blades so that the predetermined spacing between the bottom of the blade box and the pavement surface may be maintained. As shown in FIGS. 5 and 6, the blade box vacuum system is provided with several guide pins (51) which allow the blade box vacuum system to "float" within a vertical range of approximately one inch. These pins slide within clearance holes formed in flanges (53) which are welded to a cross beam channel member (55) which forms a part of the main frame or chassis of the grooving apparatus.

Since the drive shaft (57) of the grooving blades (59) is rigidly fixed to the groover chassis, downward movement or adjustment of the ganged blades will also result in a corresponding movement of the chassis. However, since the blade box is not rigidly attached to the frame and is free from contact with the blades, the height of the blade box will remain as set. A clearance slot (60) is formed in opposed sides of the blade box to avoid contact with the blade shaft assembly. Thus, the spacing of the blade box from the pavement may be maintained independently of the rest of the pavement grooving apparatus.

Since the swarf enters the intake ports of the front and rear ducts as a water and airborne medium, the phenomenon of hydraulic angle comes into play and must be considered when designing the ducts. More particularly, radical directional changes in the flow path of the water, swarf and air must be avoided in order to prevent turbulent flow causing the swarf slurry to fall out of suspension and clog the ducts. This consideration led to the design of a constant acceleration transition duct for the front and rear ducts. These front and rear transition ducts (56,58) are respectively shown in FIGS. 7 and 8.

Figure 7:
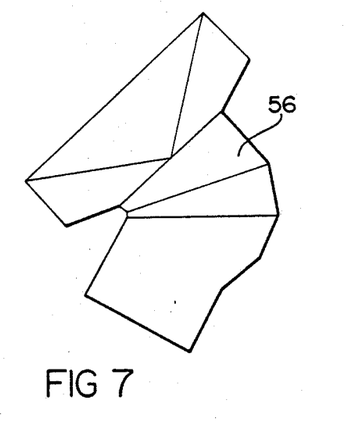
FIG. 7 is a top plan view of the front transition duct.
Figure 8:
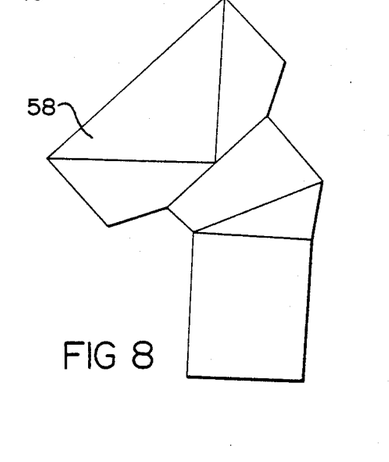
FIG. 8 is a top plan view of the rear transition duct.

The transition ducts serve to channel the slurry through a gradual turn rather than an abrupt turn in order to prevent turbulence. These ducts are also designed with a constantly converging cross-section so that the constant acceleration of the water and swarf slurry is maintained from its initial entry into the ducts through its exit from the transition ducts. Once the water and swarf slurry leaves the exit of each transition duct it enters one of the circular rubber ducts (40,41)

each of which is directly and separately coupled to the cyclone separator.

A significant advantage is realized by directly and independently coupling each nozzle of the two-nozzle system to the cyclone separator. This independent ducting arrangement greatly simplifies setting and maintaining the vacuum balance and resulting flow rates between the front and rear nozzles and allows one nozzle to be effectively provided with a variable intake port. In the system shown in FIG. 6 the front duct (31) is provided with a variable opening (61) as this nozzle receives the majority of the slurry and can benefit most from this adjustment in several ways.

Figure 9:
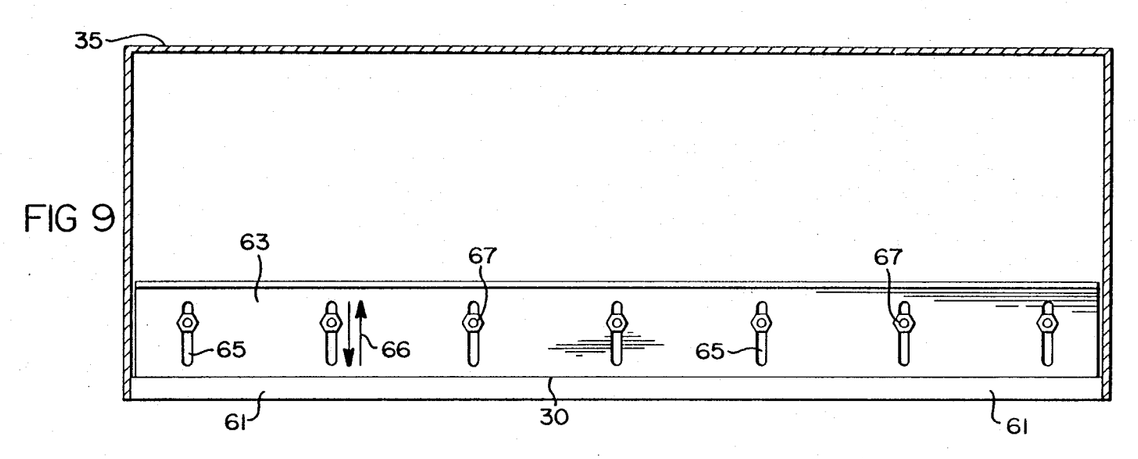
FIG. 9 is a sectional view through the blade box taken along line IX—IX of FIG. 6 showing the adjustable blast gate.

The structure of the variable opening is further shown in FIG. 9. A blast gate member (63) is shown having a plurality of slots (65) formed therein for vertical adjustment to vary the inlet opening of the front nozzle. Any suitable fastener such as the threaded bolt and nut fasteners (67) may be used to secure the blast gate to the inner front wall of the blade box.

The variable or adjustable opening of the front nozzle enables an accurate vacuum balance and flow ratio to be set between the front and rear nozzles. This flow adjustment is desirable because the front nozzle, which receives most of the slurry, may be adjusted to receive the majority of vacuum induced flow in order to generate the necessary air flow into the duct required to remove the majority of slurry. In this manner, a fine tuning of front and rear flow rates may be achieved so that only enough flow is provided through the rear duct as required to "mop up" any remaining slurry. This adjustment thus ensures that as much flow as is practically available is provided through the front duct.

Another benefit of the adjustable nozzle is that it may be adjusted to take advantage of the tangential acceleration effects of a rotating blade partially submerged in a fluid medium. That is, the front nozzle is nominally adjustable over about a three inch vertical range as indicated by arrows (66). This adjustment changes both the location and the free area opening of the nozzle. This also allows the height of the nozzle opening to be adjusted according to the depth of the grooves being cut so that the majority of the tangentially accelerated fluid stream from each blade is driven directly at the nozzle opening as shown by arrows (68) in FIG. 6.

The advantages of this arrangement are greater than may appear at first. By directing the slurry right into the nozzle opening without first returning to the pavement, the kinetic energy of the driven slurry is exploited to lift the slurry from the pavement into the front nozzle under the natural hurling action of the rotating blades. Thus, a moving fluid stream of slurry rather than a static pool of slurry is captured by the vacuum system. What this means is that the vacuum system does not have to supply the energy necessary for lifting the slurry up from the pavement and results in a far more efficient system.

Prior systems ignored the fact that the cutting blades accelerate and actually move or pump the slurry forwards and upwards during the grooving process. Such systems constrained the hurled slurry by some form of blade shroud thereby decelerating it and allowed it to run back to the pavement. It was then necessary to reaccelerate the static slurry into the intake nozzle at the expense of increased energy requirements of the vacuum pickup system. In contrast, the present invention makes full use of the flowing slurry stream so that the vacuum system energy requirements for picking up the slurry are much less than previously required.

Figure 10:
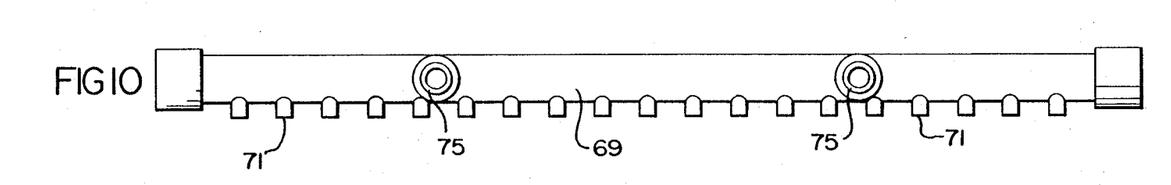
FIG. 10 is a top plan view of the spray bar.
Figure 11:
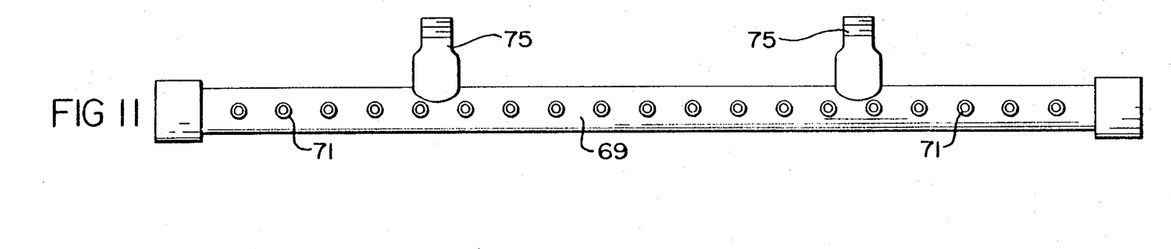
FIG. 11 is a front elevation view of the spray bar.

Another important feature of the blade box vacuum system is shown in FIGS. 6, 10 and 11 wherein spray bar (69) is shown mounted within the blade box for supplying the water needed to cool the blade and flush the swarf from the grooved pavement. In order for the water to reach the face of the groove where the pavement is being cut or abraded, the water must be carried by the pumping action of the blades. This is most effectively accomplished when the velocity of the water is matched with the tangential velocity of the blade so that upon mutual impact, no significant velocity difference exists therebetween.

If the velocity of the water is significantly different from the velocity of the blades, a phenomenon known as "bounce back" will occur where, in the typical case, the relatively slow moving water droplets will be repelled by the fast moving blade in a manner analogous to a ball being hit by a bat. When this occurs, insufficient water reaches the cutting surface. This condition accelerates blade wear. As it is desirable to rotate the blades at as high an angular velocity as possible, a problem has been to spray the blades with a water jet having sufficient velocity to prevent bounce back. This problem has been overcome by disposing the water jet spray bar within the blade box as close as possible to the periphery of the blades so that the water jet velocity will not significantly decrease before it reaches the blades.

The spray bar is mounted so that its jet nozzles (71) are aligned to direct the water jets (73) at a tangent to the blades as shown in FIG. 6. This impact tangency reduces bounce back even further and takes maximum advantage of the action of the blades to carry the water to the surface of the pavement being cut at the blade pavement contact interface. The spray bar is of conventional design and is fed by water hoses (75) which enter the top of the blade box through ports (77) shown in FIG. 5.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for removing a water and swarf slurry from a surface portion of a pavement grooving site, comprising:

a blade shroud for covering said grooving site and for maintaining a vacuum induced flow therein;

blade means disposed within said blade shroud for grooving pavement;

nozzle means operatively associated with said blade shroud for drawing said slurry into said apparatus in an airborne flow;

said nozzle means disposed so as to receive said slurry directly from said blade means, such that a substantial portion of said slurry driven by said blade means directly enters said nozzle means; and duct means directly connected to said nozzle means for transporting said slurry away from said grooving site via said airborne flow, said duct means defining a flow path having a substantially constantly decreasing cross-sectional area so that said slurry is substantially constantly accelerated therethrough to prevent clogging of said duct means by said slurry.

2. The apparatus of claim 1 wherein said nozzle means comprises a single nozzle provided on said blade shroud.

3. The apparatus of claim 1 wherein said nozzle means comprises a first nozzle provided on one end of said blade shroud and a second nozzle provided on a second opposite end of said blade shroud.

4. The apparatus of claim 3 wherein said first nozzle comprises a larger intake port area than said second nozzle such that most of said slurry is removed by said first nozzle.

5. The apparatus of claim 1 further comprising adjustable gate means provided on a portion of said nozzle means for adjusting flow into said nozzle means.

6. The apparatus of claim 5 wherein said gate means is vertically adjustable.

7. The apparatus of claim 1 further comprising rolling means connected to said blade shroud for providing rolling contact upon said surface portion of said pavement grooving site.

8. The apparatus of claim 7 wherein said rolling means further comprises height adjusting means for adjusting the height of said blade shroud above said surface portion of said pavement grooving site.

9. The apparatus of claim 1 further comprising means for maintaining a predetermined clearance between a bottom portion of said blade shroud and said surface portion of said pavement grooving site.

10. The apparatus of claim 1 further comprising spraying means disposed within said blade shroud for spraying water onto said pavement grooving site.

11. The apparatus of claim 1 wherein said nozzle means extends across substantially the full width of said blade shroud.

12. The apparatus of claim 1 wherein said duct means comprises a portion of said blade shroud.

13. An apparatus for removing a water and swarf slurry from a surface portion of a pavement grooving site, comprising:
- a blade shroud for covering said grooving site and for maintaining a vacuum induced flow therein;
- blade means disposed within said blade shroud for grooving pavement;
- nozzle means operatively associated with said blade shroud for drawing said slurry into said apparatus in an airborne flow;
- said nozzle means forming an intake port which is disposed so as to receive said slurry directly from said blade means such that a substantial portion of said slurry driven by said blade means directly enters said intake port as an airborne flow without first returning to said surface portion of said pavement grooving site; and
- duct means directly connected to said nozzle means for transporting said slurry away from said grooving site through said intake port via said airborne flow.

* * * * *